US005932038A

United States Patent [19]

Bach et al.

[11] Patent Number: 5,932,038

[45] Date of Patent: Aug. 3, 1999

[54] METHOD OF FABRICATING A STRAW PANEL, BOARD, OR BEAM

[75] Inventors: Lars Bach; Kenneth W. Domier; Raymond Holowach, all of Edmonton, Canada

[73] Assignee: Alberta Research Council, Edmonton, Canada

[21] Appl. No.: 09/119,041

[22] Filed: Jul. 20, 1998

[30] Foreign Application Priority Data

Jul. 24, 1997 [CA] Canada .................................. 2211472
Apr. 15, 1998 [CA] Canada .................................. 2234889

[51] Int. Cl.[6] ............................... B32B 5/12; B32B 31/20

[52] U.S. Cl. ......................... 156/62.2; 156/259; 156/296; 156/433; 264/113; 264/437

[58] Field of Search .................................... 156/62.2, 296, 156/433, 259, 271; 264/108, 109, 113, 437; 198/382, 533; 425/110

[56] References Cited

U.S. PATENT DOCUMENTS 4,505,777 3/1985 Richter .
4,773,762 9/1988 Albers .
5,498,469 3/1996 Howard et al. .
5,505,238 4/1996 Fujii et al. .
5,610,232 3/1997 Duan et al. .
5,656,129 8/1997 Good et al. .
5,728,269 3/1998 Kohno et al. .
5,729,936 3/1998 Maxwell .
5,730,830 3/1998 Hall .

FOREIGN PATENT DOCUMENTS 0 373 725 6/1990 European Pat. Off. .
0 751 267 1/1997 European Pat. Off. .
58 037070 3/1983 Japan .
WO 97 38833 10/1997 WIPO .

*Primary Examiner*—Sam Chuan Yao
*Attorney, Agent, or Firm*—Neil Teitelbaum & Associates

[57] ABSTRACT

A structural panel, board, or beam and method of making same, with straw that is oriented is provided. The straw is preferably oriented such that strands are parallel oriented in one or more directions. The straw strands are chopped, split, and a binder such as MDI is added.

15 Claims, 14 Drawing Sheets

*Modulus of Rupture (MOR) in the parallel direction divided with MOR in the perpendicular direction of the same panel

METHOD OF FABRICATING A STRAW PANEL, BOARD, OR BEAM

FIELD OF THE INVENTION

This invention relates generally to a structural board made of straw and to a method and device for making a structural board made of straw.

BACKGROUND OF THE INVENTION

In the past, straw was not considered a suitable structural material. Unlike wood, straw has not been considered for its strength and has not commonly been considered as a building material. Current trends in the use of straw for construction involve straw bales where dense packing and size provide necessary strength and structural support. In fact, in many countries, the use of straw for construction is not permitted due to a common conception that straw is a poor building material.

In the description that follows the term cereal straw is to encompass other lignocellulosic material that is cereal straw-like in structure, such as rice straw and bamboo. Heretofore a thin panel of compressed non-woody lignocellulosic material (i.e. straw) has been made by mixing short straw pieces with a binder. Disclosure of this thin panel is found in U.S. Pat. No. 5,498,469 in the name of Howard et al. issued Mar. 12, 1996, incorporated herein by reference. The panel is used as a core layer or core stock in a plywood laminate; thus a thin layer of straw panel, is sandwiched between two layers or sheets of plywood. Although this thin panel ~0.10 inches appears to perform its intended function, the thin panels do not have sufficient strength as structural boards. The panels were incorporated with stronger wood laminate layers for the production of plywood.

Other references relating to fiber panel methods of manufacture and devices for making such panels are: U.S. Pat. No. 5,730,830 in the name of Hall, issued Mar. 24, 1998; U.S. Pat. No. 5,729,936 in the name of Maxwell, issued Mar. 24, 1998; and, U.S. Pat. No. 5,728,269 in the name of Kohno et al., issued Mar. 17, 1998.

It is an object of this invention, to provide a structural board that does not require expensive laminations forming wood/straw composites.

It is an object of this invention to provide a structural board comprised of straw and having a strength that far exceeds the strength of the straw panel described by Howard et al.

In accordance with this invention, a board or panel is provided wherein the majority of strands of straw are substantially oriented in a parallel fashion. The strands are combined with a binder.

In accordance with another aspect of the invention a board is provided wherein strands of straw are oriented in a predetermined fashion or wherein at least straw strands within at least a layer are oriented in a substantially predetermined fashion.

In accordance with the invention, there is provided, a panel, board, or beam, comprising:

- a compressed straw elongate material having a plurality of strands, a plurality of the strands being substantially split longitudinally to allow a binder to contact some of the inside of the strands; and binder for binding the straw into a solid panel, board or beam.

In accordance with the invention, a panel, board, or beam, is provided comprising:

- a compressed straw elongate material having a plurality of split strands, a plurality of the split strands being oriented in a predetermined manner; and isocyanate binder for binding the straw into a solid panel, board or beam.

In accordance with another aspect of the invention, there is provided, a method of fabricating a panel, board or beam comprising:

- providing a plurality of strands of cereal straw;
- splitting the cereal straw;
- orienting the cereal straw such that a plurality of strands are substantially parallel; and,
- adding binder to the cereal straw.

In accordance with the invention, there is provided, a panel, board, or beam, comprising:

- a core of:
  - a compressed straw elongate material having a plurality of strands, a plurality of the strands being substantially split to allow a binder to contact some of the inside of the strands; and
  - binder for binding the straw into a solid panel, board or beam; and,
- outer layers comprised of compressed strands of lignocellulose material other than straw.

In accordance with the invention a device for splitting straw is provided comprising two closely spaced shear rollers, said rollers being substantially the same size and having a diameter of substantially about 200 mm–800 mm.

In accordance with yet another aspect of the invention, a straw panel is provided bonded with MDI (DiphenylMethane Diisocyanate) resin and preferably, wherein a DPMA (DipropyleneGlycolMonomethylEtherAcetate) extender is used.

The strands preferably have a length of about 10 mm or greater, and preferably, are 50–100 mm long.

Structural, board, beams or panels can be fabricated in accordance with the teachings of this invention.

BRIEF DESCRIPTION OF THE DRAWINGS

Exemplary embodiments of the invention will now be described in conjunction with the drawings, in which.

DETAILED DESCRIPTION

Figure 1:
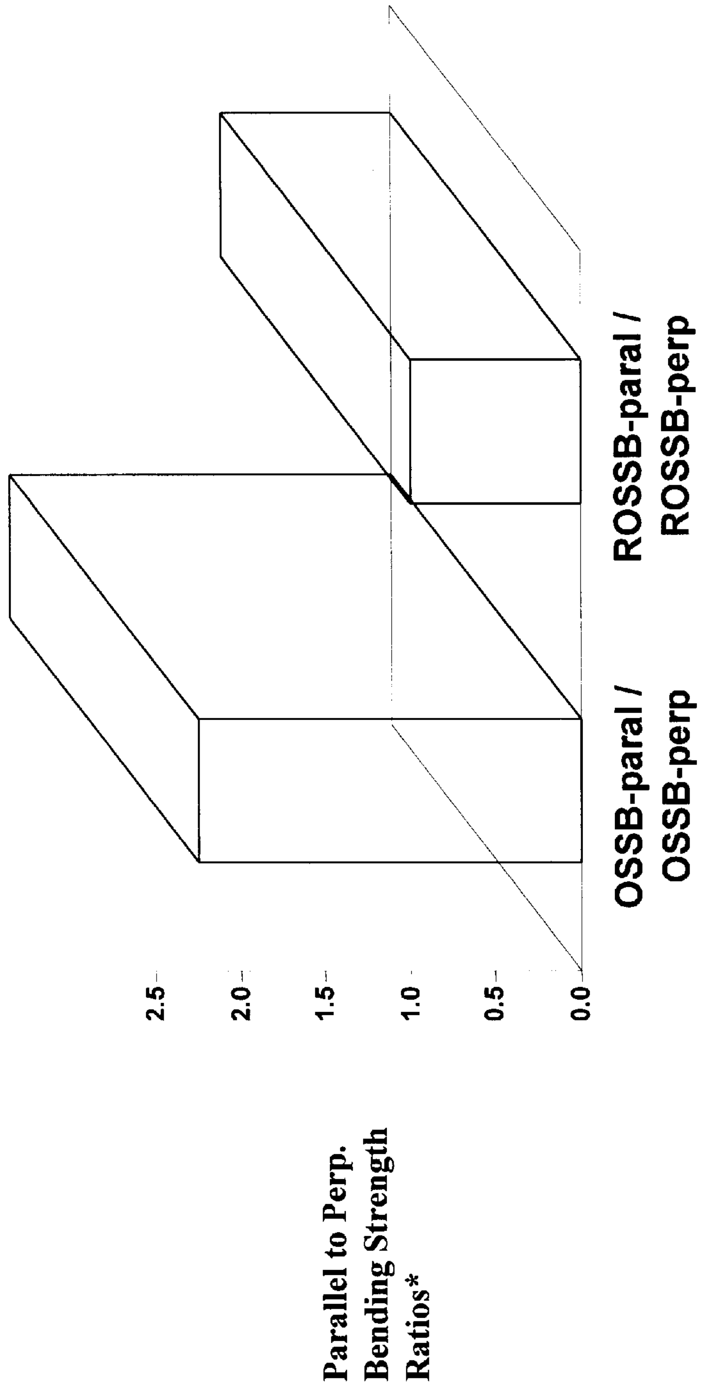
FIG. 1 is a graph comparing the bending ratio of a random oriented straw strand board (ROSSB) and an oriented straw strand board (OSSB)

Referring now to FIG. 1 graphs are shown comparing the bending ratio of a random oriented straw strand board ROSSB and an oriented straw strand board OSSB, wherein orientation of the strands is purposeful, and the strands are oriented so as to be substantially parallel with one another. The relative bending ratio of OSSB to ROSSB in the parallel direction is shown in these figures to be approximately 2:1, but could be as small as 1.05:1.00 and still be useful. The length of the split wheat strands used was 5 mm to 100 mm.

Figure 2:
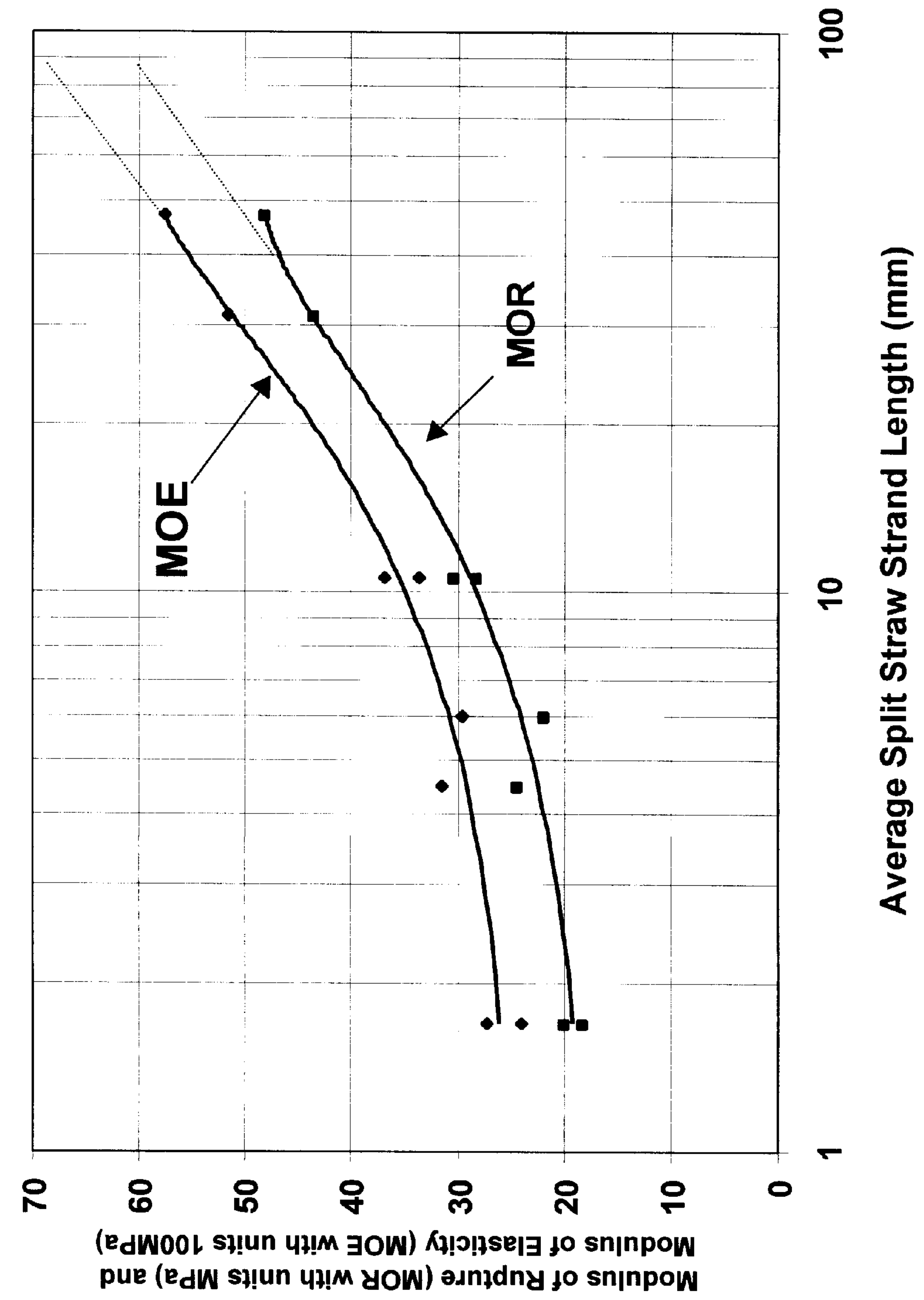
FIG. 2 is a graph of the modulus of rupture, and modulus of elasticity versus the average split straw strand length.

FIG. 2 shows the bending properties of composite straw boards made with different longitudinally split wheat straw strand length. It can be seen that as the length of the straw increases, the bending strength and stiffness increases as well.

Figure 3:
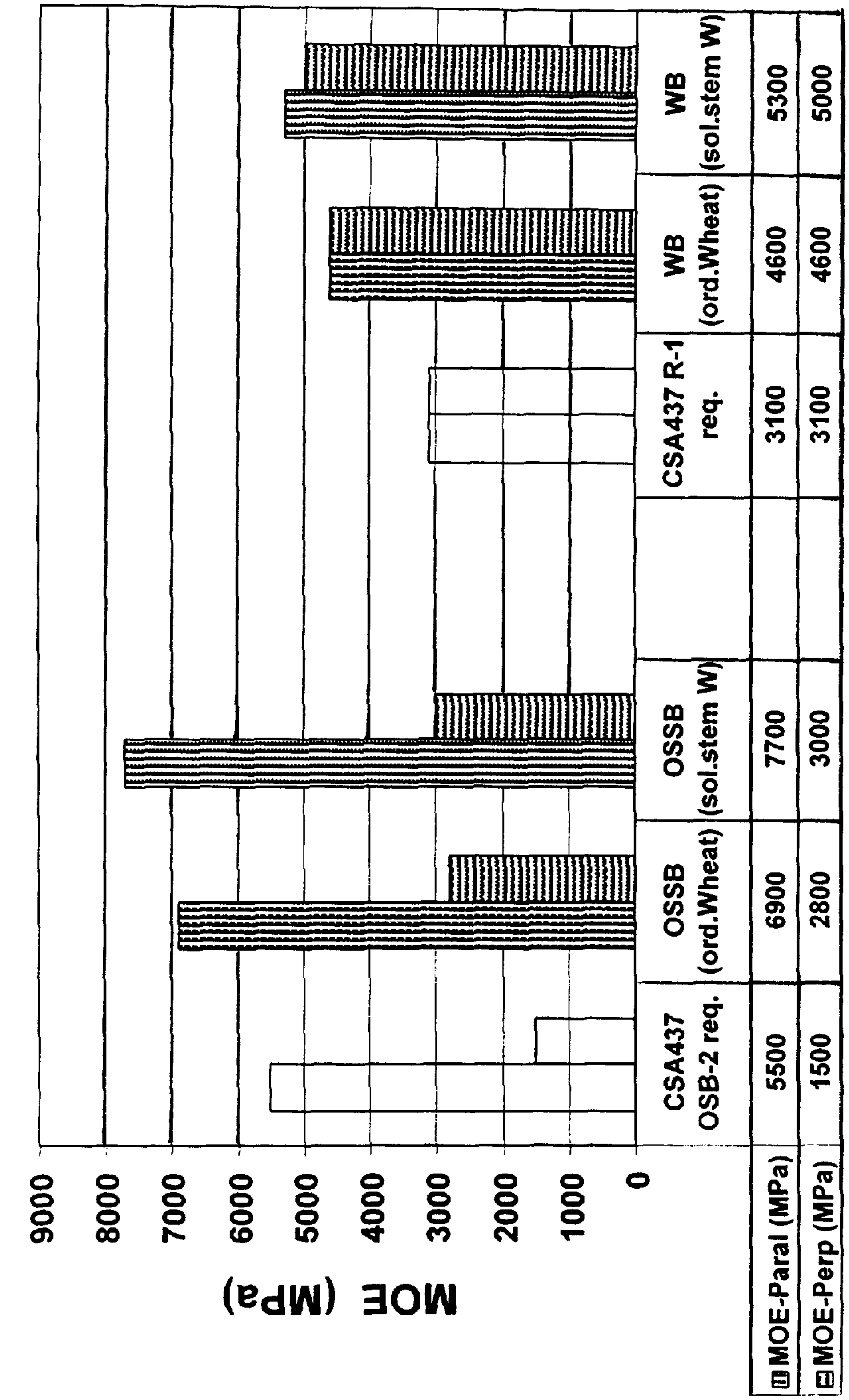
FIG. 3 is a graph depicting the modulus of elasticity of waferboard made from split wheat straw.

FIG. 3 is a graph depicting the modulus of elasticity of waferboard made from split wheat straw, wherein the solid shaded columns illustrate the minimum property requirement in the Canadian code (CSA 437) for "wood-based" oriented and random oriented sectional panels.

Figure 4:
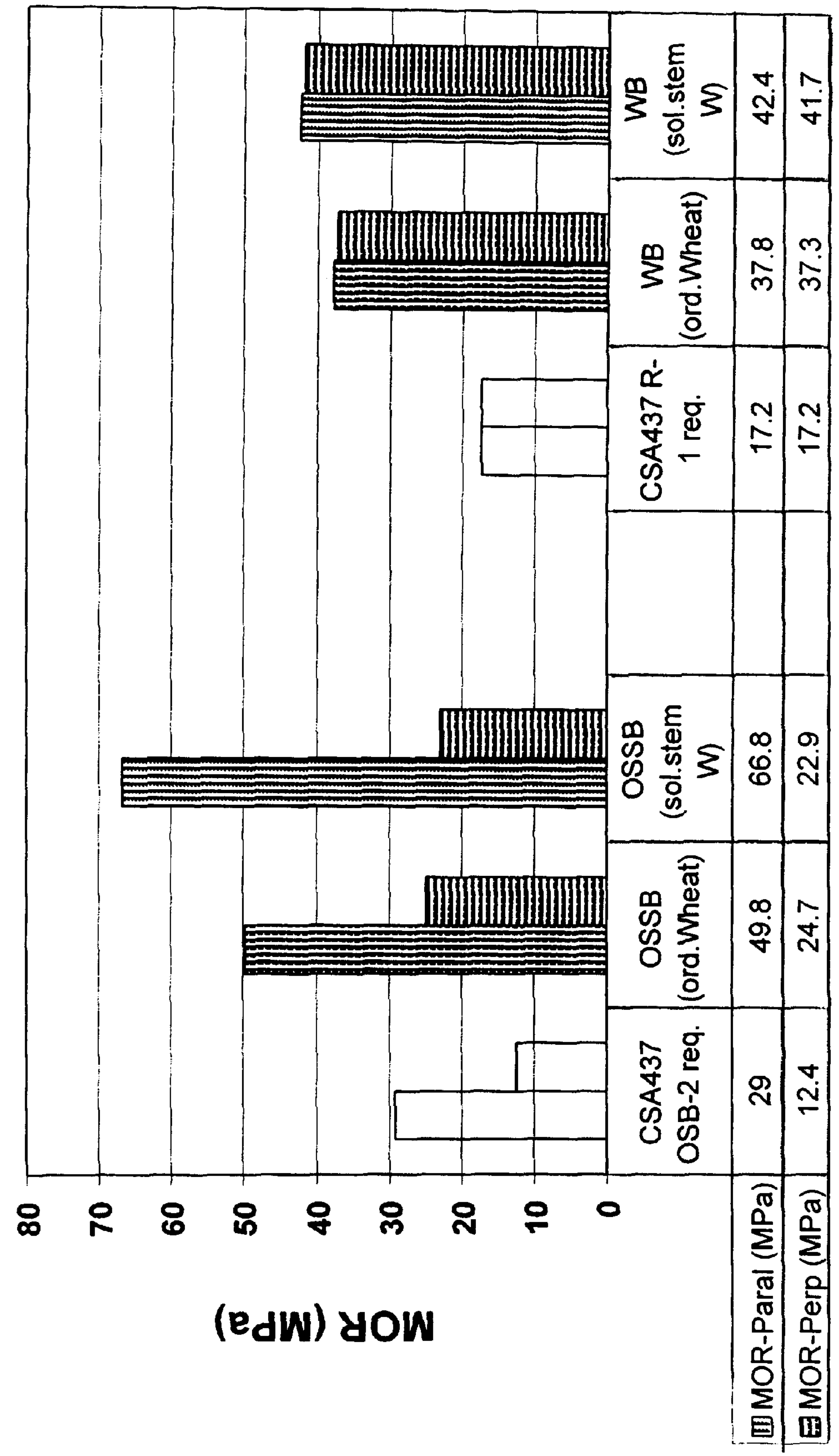
FIG. 4 is a graph depicting the bending strength of OSSB and waferboard made from split wheat straw.

FIG. 4 is a graph depicting the bending strength of OSSB and waferboard made from split wheat straw, wherein the solid shaded columns illustrate the minimum property requirement in the Canadian code (CSA 437) for "wood-based" oriented and random oriented sectional panels.

Figure 5:
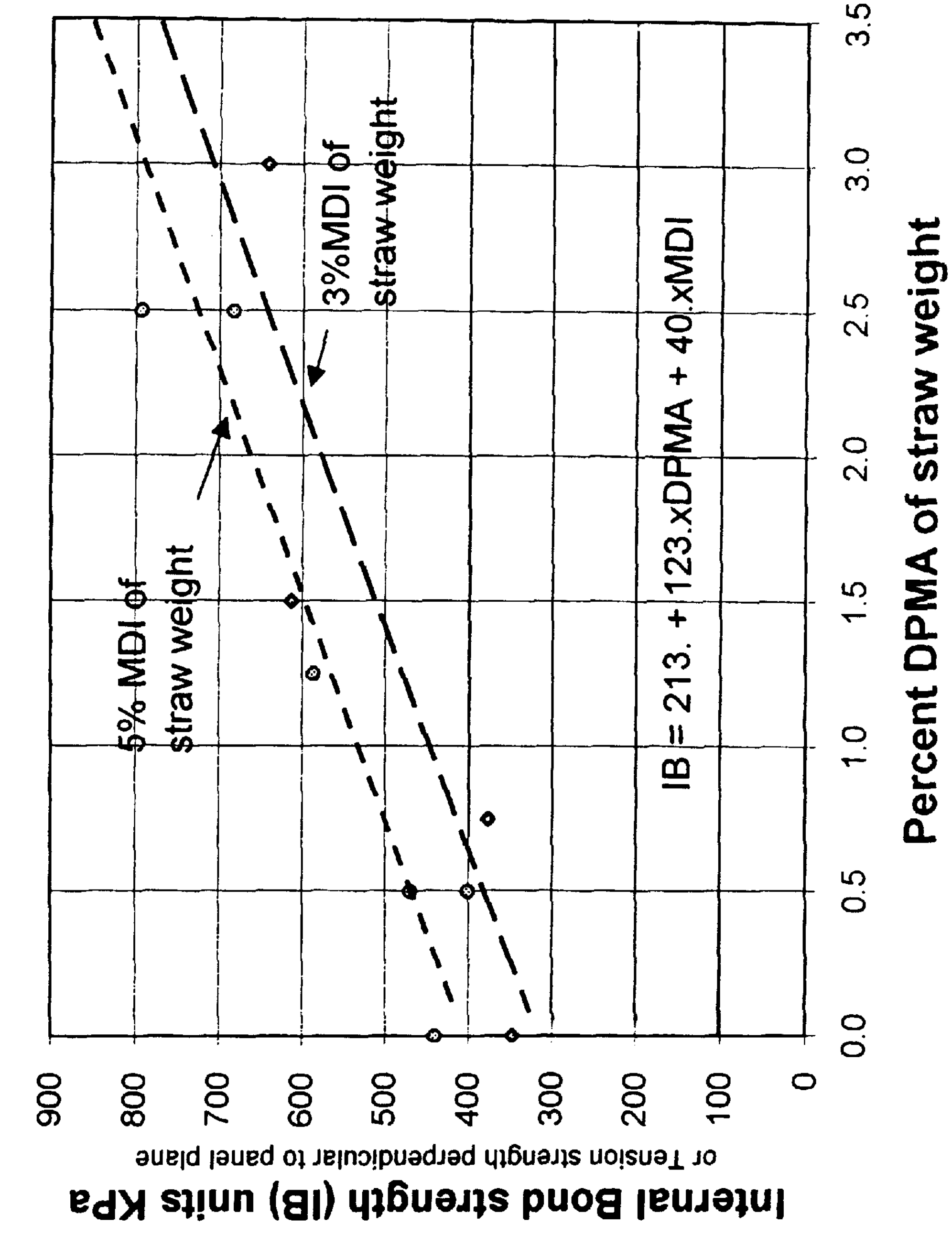
FIG. 5 is a graph depicting internal bond strength of straw panels bonded with MDI resin extended with DPMA.

FIG. 5 is a graph depicting internal bond strength of straw panels bonded with MDI resin extended with DPMA.

In order to obtain maximum strength, the straw should be split, to ensure that the exterior and interior surfaces of the hollow straw stem core can be coated with a binder prior to hot pressing.

In addition to splitting the straw, it can be treated in such a manner as to at least partially strip the wax on the waxy outside stem by using a solvent. After removing the wax and splitting the straw, it becomes easier to glue and requires less glue to be used. More importantly, the finished board has greater internal bond strength. The preferred binder is MDI Isocyanate resin such as ICI's "Rubinate 1840", or Dow's "PAPI-94". Phenolic resin normally used for wood panel does not bond well to straw.

Transverse cutting or chopping of the straw can be accomplished by using a forage harvester.

Longitudinal straw cracking/splitting and node crushing can be accomplished by using one of:

a) grooved rollers, for example a grain roller mill or a hay macerator b) a sander having shear action provided by equipment with rolling shear c) a CAE 6/36 disk waferizer ("feeding" with straw bundles rather than small logs as it is designed to be used)

d) a CAE 12/48 ringflaker (6") with small compressed bales of straw or a e) a hammermill.

The combination of (a) and (e), a roller mill and a hammermill has the best results. The use of (b) and (c) is not preferred. A ringflaker (d) is useable but it has the limitation that it does not crush the node of the straw adequately.

Fines removal from split straw can be achieved by screening or air or fractionation. Once the straw has been split and separated, the strands must be oriented such that the strands are substantially parallel.

For strands longer than 1.0 mm moderate straw strand orientation can be achieved with minor modifications to commercially available equipment for orienting wood strands for OSB. This can also be accomplished by vibrating the strands on a corrugated panel, preferably tilted at approximately 20 degrees, or alternatively the straw strands can be dropped on parallel-aligned vertical bars placed in the form of a spaced grid with a distance less than the strand length. Shaking will then allow the straw to fall through.

For strands less than 1.0 mm, letting the strands fall between vertical oppositely charged electric condenser panels will align the straw. The dipole on the falling straw particles will align the particles parallel to the electric field.

Structural panel, boards, and beams can be made in this manner, by ensuring that the longitudinal axes of the straw are aligned.

The panel, board, or beam in accordance with an aspect of this invention consists essentially of longitudinal split straw and resin binder such as MDI, wherein the straw has been oriented such that the longitudinal axes of the straw pieces are substantially parallel. It has been found that the use of DPMA (DOWANOL™) extends the coverage of MDI applied.

In another embodiment of this invention, a straw panel board is comprised of oriented strand wood board having a straw core. This embodiment has the advantage of providing a core made of lignocellulose material other than wood, where wood reserves are low, or the availability of wood is limited, while not sacrificing the structural integrity of the board. Furthermore, in some instances the appearance of wood on the outside faces of a panel board is of a commercial importance, and this embodiment meets this requirement.

In yet another embodiment of this invention, an oriented straw panel comprised of cementitious materials up to 50% (by weight), has been made. This embodiment has the advantage of providing a high degree of fire resistance combined with mechanical properties that exceeds the minimum strength requirement for wood based structural panels.

Figure 6:
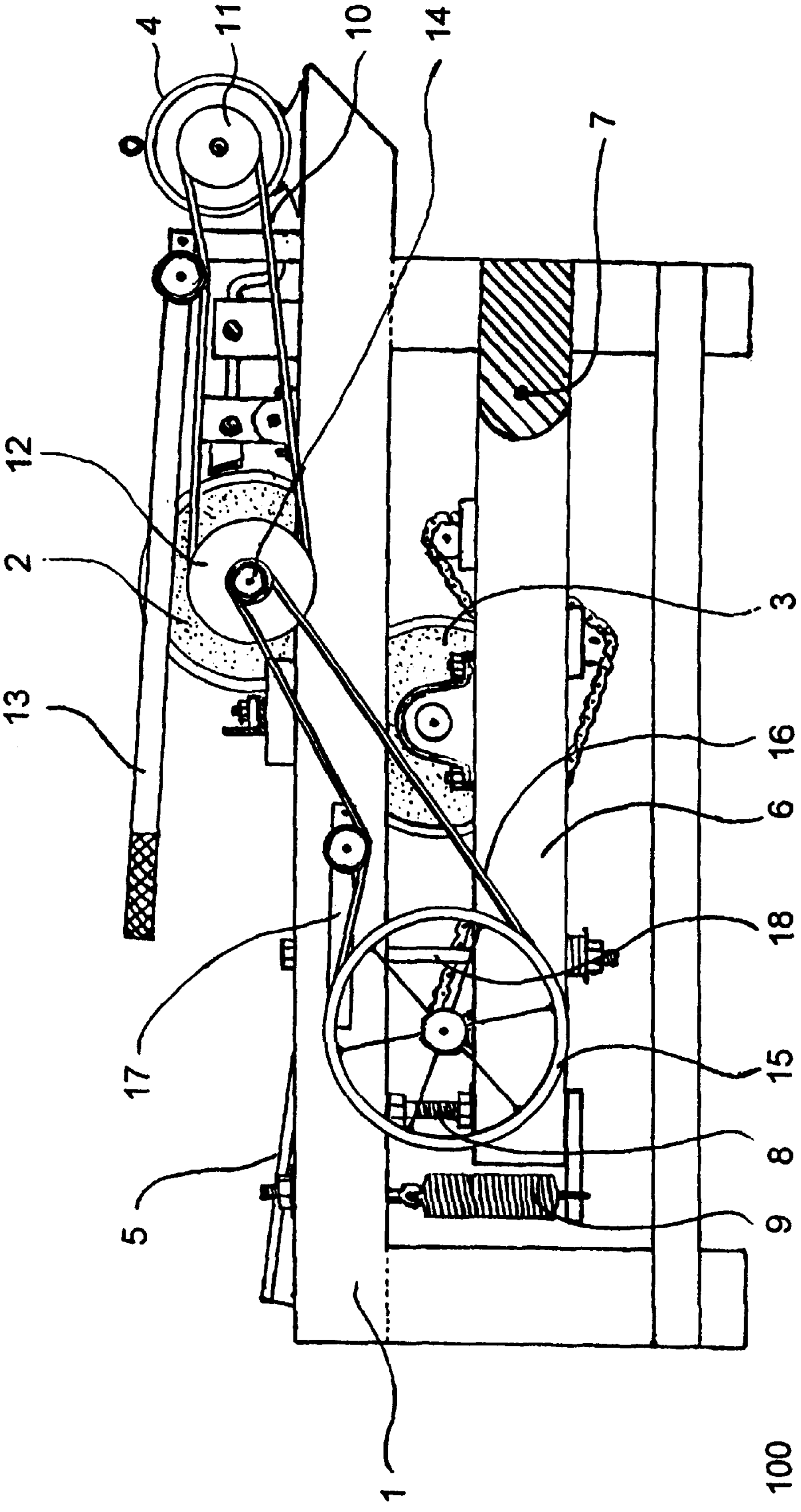
FIG. 6 illustrates a side view of a straw splitter according to the invention.

Referring to FIG. 6, a side view of a device 100 for longitudinally splitting straw for use in making a panel, board or beam according to the invention is shown. The device 100 comprises a supporting bench 1, a feed table 5 and two machine grooved shear rollers 2 and 3 oppositely driven at different rotational speeds by an electric motor 4. The straw is fed generally parallel to the roller axes using the feed table 5 angled downwardly towards the two shear rollers 2 and 3 where it is split longitudinally due to the shear action between the two shear rollers. Of course, alternatively, the roller's diameters can be varied such that they are driven at the same rotational speed but have substantially different peripheral velocity. The term peripheral velocity is used to indicate that the rollers are of the same size and are driven at different rotational speeds, or that the rollers are of different sizes and are driven at the same or different rotational speeds.

The upper shear roller 2 is affixed to the supporting bench 1, while the lower shear roller 3 is affixed to a supporting arm 6 pivoted to the bench 1 at the joint 7. The clearance between the two shear rollers is adjusted using an adjustment mechanism comprising an elevating screw 8 and a tension spring 9. Other embodiments for adjusting the clearance between the two shear rollers may be envisaged, such as a ratchet gear or rack hoisting gear. The adjustment mechanism is also used for lowering the shear roller 3 in case some material is stuck between the shear rollers or for cleaning purposes.

The upper shear roller 2 is driven counterclockwise at approximately 500 rpm to 1500 rpm by the speed - controlled electric motor 4 using a V - belt drive or other such drive means. The V - belt drive comprises a V - belt 10 and V - belt pulleys 11 and 12 being affixed to the axis of the electric motor 5 and the upper shear roller 2 respectively. The V - belt 10 is tightened using the primary tension lever 13. For overload protection of the electric motor 5 the V - belt pulley 11 comprises an overload clutch such as a slipping clutch. An emergency shut off is preferably also included.

Both shear rollers are made of hardened steel as a hollow cylinder of approximately 500 mm to 2000 mm in length and 200 mm to 800 mm in diameter. The shear roller surfaces comprise parallel cutting edges oriented at angles between 0° to 45° to the shear roller axis, seen in FIGS. 9 and 11. Cutting edges are machined on the exterior surface of the cylinders.

The lower shear roller 3 rotates in the opposite direction to the upper shear roller 2 at a substantially lower speed, i.e. approximately 50 rpm to 150 rpm. In order to reverse the direction of rotation and to reduce the speed a chain sprocket drive is used. The first portion of the drive comprises a V - belt pulley 14 affixed to the axis of the upper shear roller, a V - belt pulley 15 affixed to the axis of the lower shear roller and a V - belt 16. To reduce the speed the driving V - belt pulley 14 has a substantially smaller diameter than the driven V - belt pulley 15. The V - belt 16 is tightened using the secondary tensioning lever 17.

Figure 7:
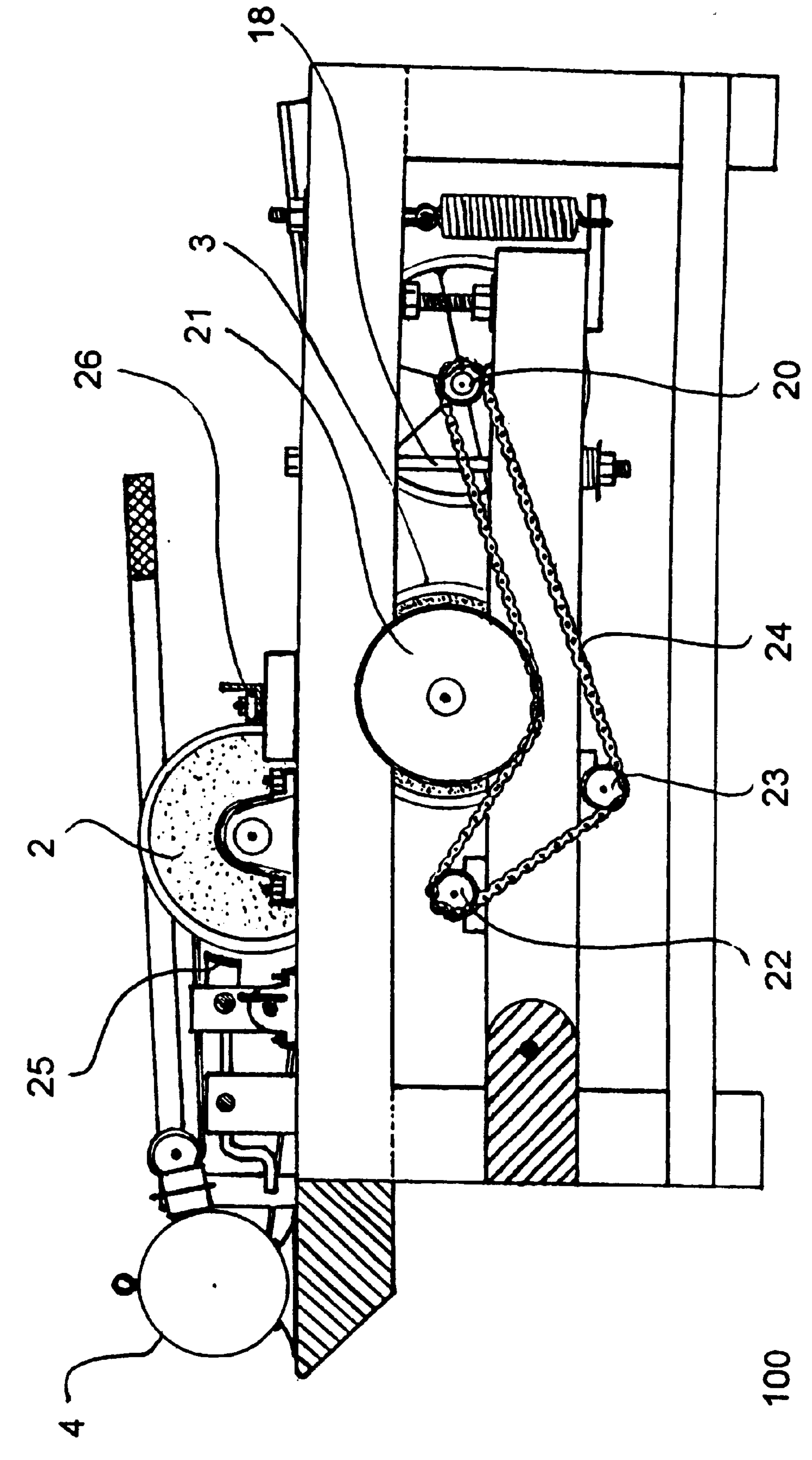
FIG. 7 illustrates a side view of the opposite side of the straw splitter according to the invention shown in FIG. 6.

Referring to FIG. 7 the opposite side view of the device 100 is shown. The second portion of the drive comprises a sprocket 20 affixed to an axis driven by the V - belt pulley 15, a sprocket wheel 21 affixed to the axis of the lower shear roller and two supporting sprocket wheels 22 and 23. To further reduce the speed the driving sprocket wheel 20 has a substantially smaller diameter than the driven sprocket wheel 21. In order to reverse the direction of rotation the chain 24 is driven by the sprocket wheel 20 on its inside and drives the sprocket wheel 21 on its outside. The sprocket wheel 22 ensures the contact between the chain 24 and a substantial part of the circumference of the sprocket wheel 21, whereas the sprocket wheel 23 keeps the lower portion of the chain 24 from contacting the upper portion.

There are numerous other embodiments for driving the two shear rollers in opposite directions and at different speeds such as: a chain drive directly driven by the electric motor; two mating gears; two smaller electric motors each driving one shear roller using a V - belt drive; two smaller electric motors each driving directly one shear roller axis using a jaw clutch; or other arrangements obvious to persons of skill in the art.

Two shear rollers having a substantially different diameter may be used to ensure the different relative peripheral velocities of the shear rollers driven with the same rotational speed. Because the relation of the two diameters is directly proportional to the relation of the two surface speeds needed for the shear action this embodiment is limited by the feasibility of the combination of shear rollers with large differences in diameter.

Figure 8:
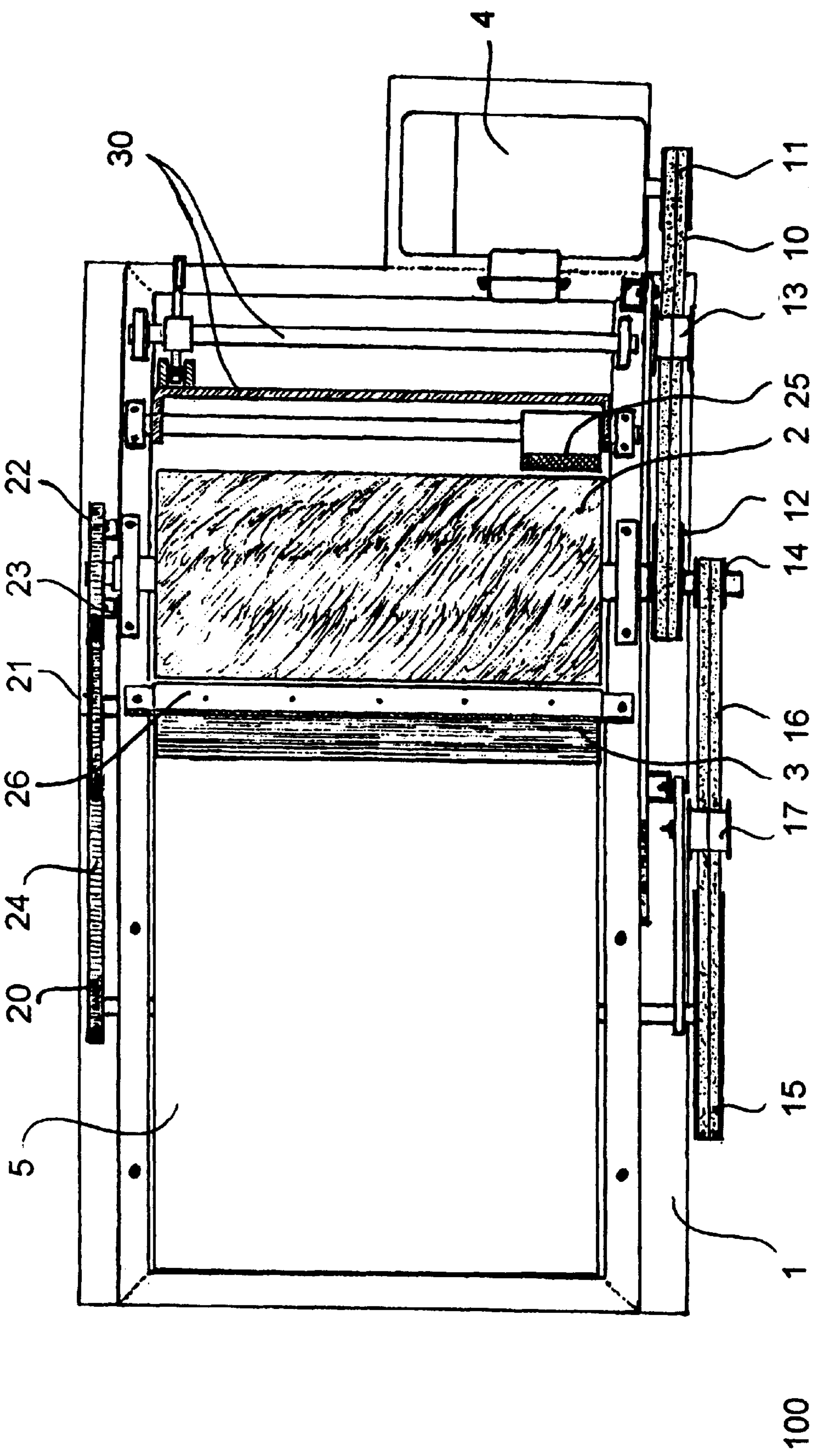
FIG. 8 illustrates a plan view of the straw splitter according to the invention shown in FIG. 6.

Referring to FIG. 8 a plan view showing the top of the device 100 is shown. The feed table 5 is angled downwardly ending at the lower shear roller 3, which then transports the straw to the shear roller 2 for splitting. Seen more clearly in FIGS. 6 and 7, the feed table 5 is supported by a linkage 18 to the support arm 6 to follow the lower shear roller 3 through all height adjustments. Seen more clearly in FIG. 9, the feed table 5 is directed towards the surface of the shear roller 3 ending very close to it for depositing the straw on the shear roller surface. The two shear rollers 2 and 3 are driven by the electric motor 4 using the V - belt drives on the one side of the device 100 and the chain drive on the other side. The cutting edges of the upper shear roller 2 are sharpened as required by holding a grind stone 25 to the surface of the upper shear roller 2 as it rotates in a direction opposite to which it is used. The grind stone 25 is advanced longitudinally using the adjustment mechanism 30 to contact and sharpen the cutting edges 41 along the full length of the shear roller 2. Sharpening of the lower shear roller is achieved by moving the sharpening assembly 25, 30 to the opposite side of the roller 2 on the underside of the supporting bench 1.

In front of the upper shear roller 2 a turbulence control mechanism comprising a ledge 26 having the length of the shear roller is affixed to the supporting bench 1. This ledge 26 assists in preventing the straw from being unduly blown about.

Figure 9:
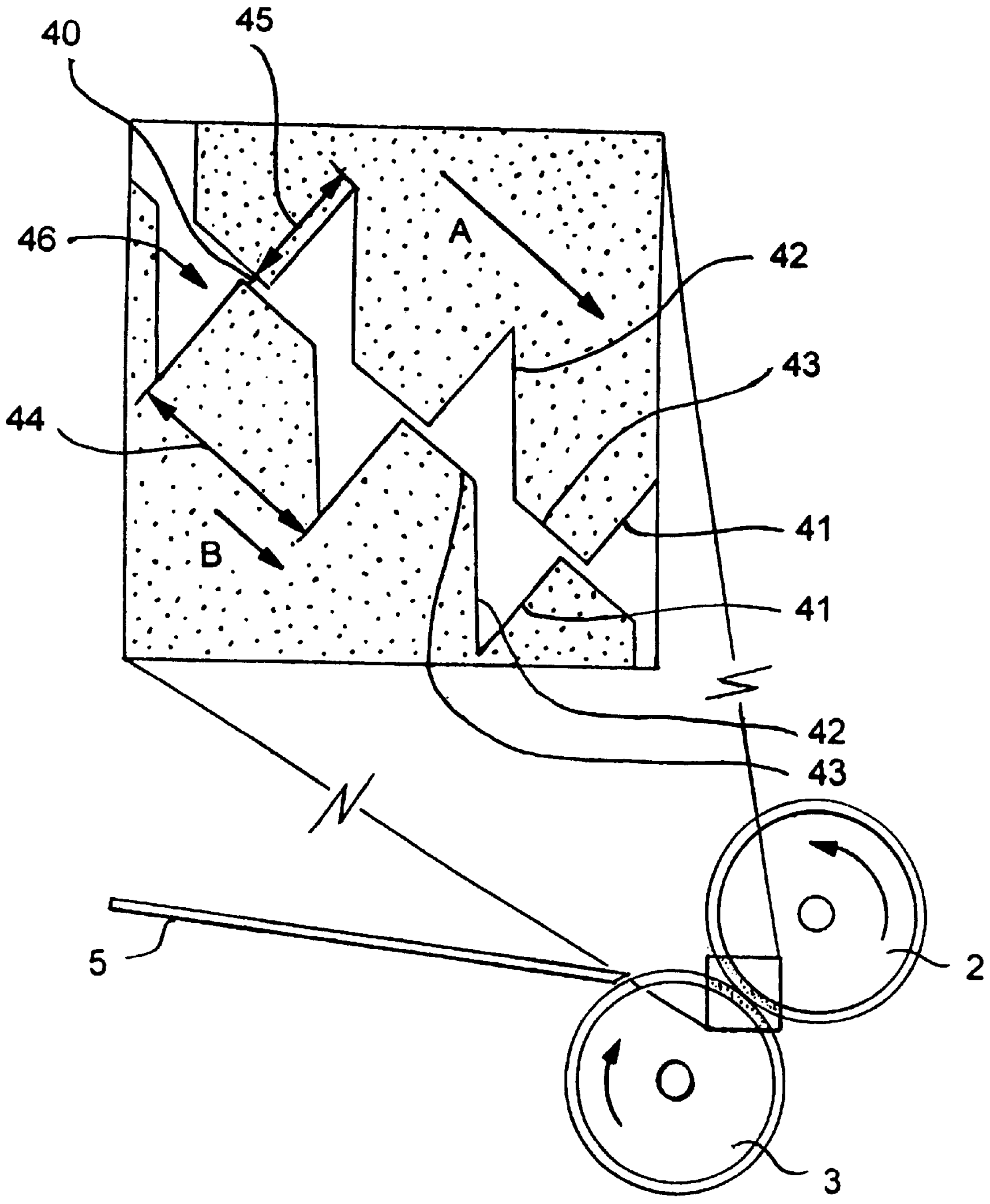
FIG. 9 illustrates a detailed view of the surface structure of the shear rollers shown in FIG. 6.

FIG. 9 shows a detailed view of the surface structure of the two shear rollers 2 and 3 rotating in opposite direction at different speeds. The straw is fed generally parallel to the axes of the shear rollers using the feed table 5. The area where the two shear rollers are closest together is enlarged to show the surfaces in detail. The clearance 40 between the two shear rollers is approximately 0.1 mm to 0.3 mm. Both shear rollers have parallel grooves 46 cut in their surfaces. These grooves have a triangular shape comprising a cutting edge 41 normal to the surface of the shear rollers whereas the opposite side 42 is at an angle of 45° to the surface of the plateau ridge 43. The groove spacing 44 is about 1.5 mm and the groove depth 45 is approximately 0.5 mm to 1.5 mm. The groove spacing 44 and the groove depth 45 are dimensioned such that they are smaller than an unsplit straw to ensure that substantially all the straw is split. The grooves 46 on shear roller 2 are arranged at an angle to the grooves 46 on shear roller 3. Numerous different shapes of the grooves may be envisaged such as the opposite side 42 of the cutting edge 41 being at an angle to the surface other than 45° or being curved. Alternatively the cutting edge 41 may have a different angle to the surface or be curved. The various shapes may also be combined differently for the two shear rollers. The cutting edge 41 of the upper shear roller 2 faces in the direction of the rotation, indicated by arrow A, and moves at about ten times the speed of the cutting edge 41 of the lower shear roller 3 which faces against the direction of the rotation, indicated by arrow B, of the lower shear roller 3.

Figure 10:
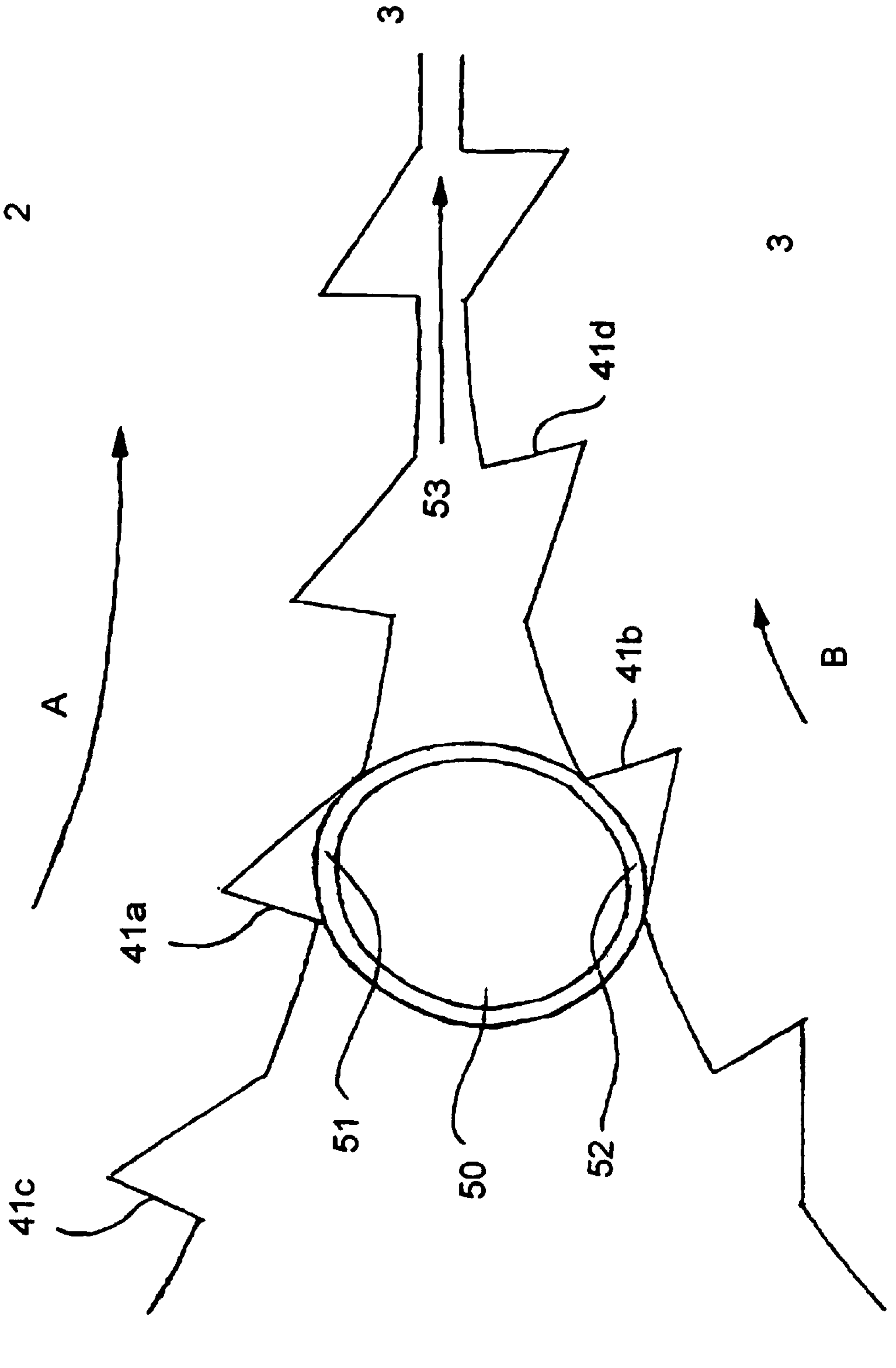
FIG. 10 illustrates the splitting process of the straw splitter according to the invention.

FIG. 10 shows an unsplit straw 50 after being fed on the lower shear roller and being transported towards the opening 53 between the two shear rollers. The lower portion of the straw is sitting in a groove 46 of the lower shear roller 3, while the upper portion is caught by the cutting edge 41 of the upper shear roller 2. Due to the different orientation of the cutting edges and the different speed of the shear rollers the straw 50 is caught by the two cutting edges 41*a* and 41*b*. Consequently an upper portion 51 of the straw is cut off by the cutting edge 41*a* due to the shear action between the two cutting edges 41*a* and 41*b*. The remaining part of the straw 50 is further transported towards the opening 53 and is then caught by the cutting edge 41*c*. When the lower portion 52 of the straw 50 is cut off the remaining part of the straw 50 is then caught by the cutting edge 41*d*. This process is repeated until the straw 50 has passed through the opening 53 between the two shear rollers 2 and 3. The split portions of the straw are transported through the opening 53 and then released.

Figure 11:
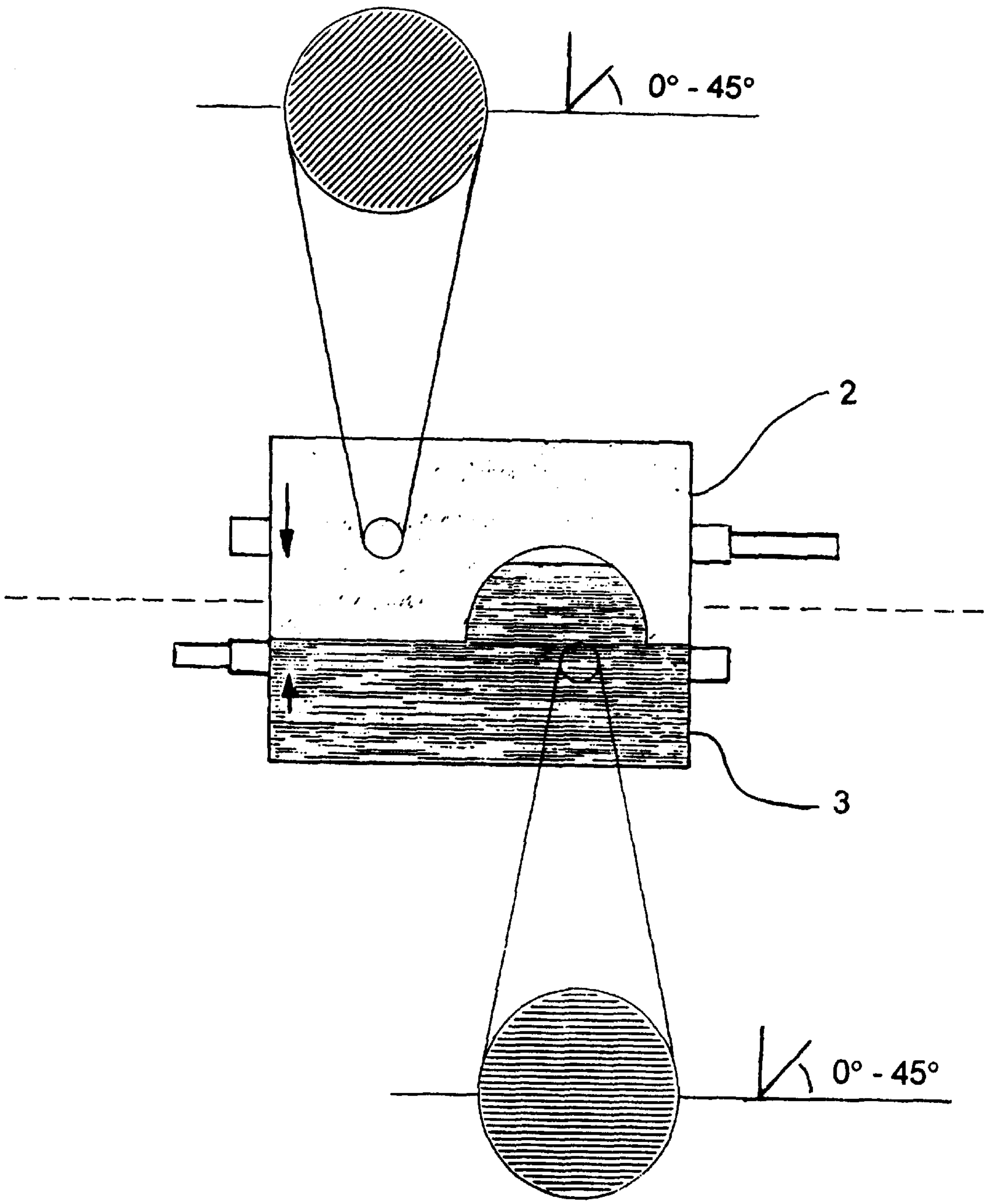
FIG. 11 illustrates the groove orientation on the surface of the shear rollers shown in FIG. 6.

FIG. 11 shows the orientation of the parallel grooves on the surface of the shear rollers. The grooves are oriented between 0° and 45° to the shear roller axis. Having a different orientation of the cutting edges for the lower 3 and the upper shear roller 2 ensures a scissor-like action to split the straw longitudinally. Advantageously, this provides long fiber pieces. FIG. 11 shows cutting edges parallel to the roller axis for the lower shear roller 3 to transport the straw 50 and cutting edges at an angle of 45° to the roller axis for the upper shear roller 2 to ensure a scissor-like longitudinal cutting. Grooves 46 parallel to the lower shear roller axis 3 allow the straw 50 which is generally aligned to the shear roller axes to be transported in the grooves 46 of the lower shear roller 3 without losing their orientation. The straw is arranged for cutting supported on its whole length by the cutting edge 41*b*. The straw 50 is then split by the cutting edges of the upper shear roller 2. Less force is needed for cutting the straw 50 if the cutting edge is at an angle to the shear roller axis. Cutting edges at an angle of 45° ensure splitting of the straw 50 into long fiber pieces while needing less force which translates into less power needed to drive the shear roller 3. Various different orientations of the grooves may be envisaged such as both shear rollers having grooves at an angle of 45° or any combination of angles between 0° to 45° on each of the rollers. A preferred combined angle is 45° on the top roller and 30° on the bottom roller.

Figure 12:
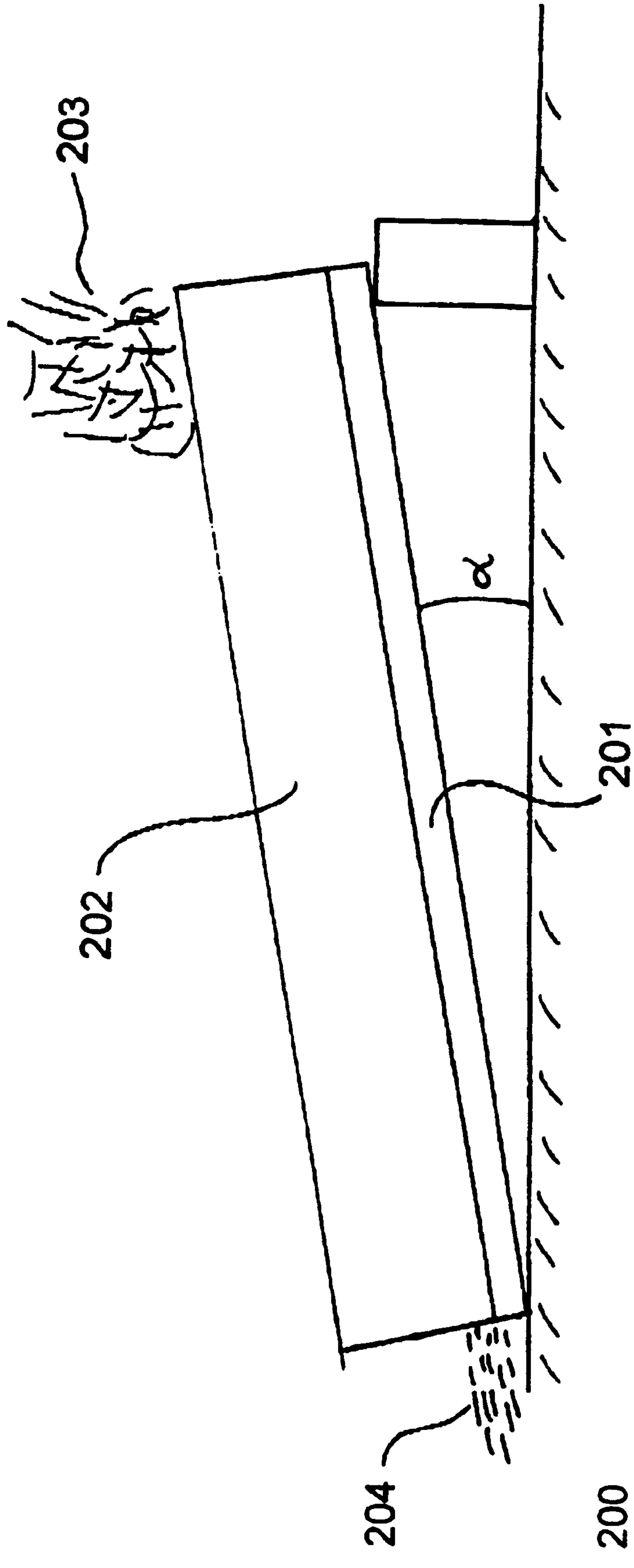
FIG. 12 illustrates a side view of a split straw orienter according to the invention.

Referring to FIG. 12 a side view of a split straw orienter 200 according to the invention is shown. For making a panel, board or beam according to the invention the split straw strands must be aligned prior to pressing. The randomly oriented split straw strands 203 are deposited onto a board 201 having a corrugated surface. The board is vibrated transversely. Due to the vibration the split straw strands are substantially aligned accumulating at the bottom of the grooves. Tilting the board ensures the movement of the split straw strands while being processed.

The split straw orienter 200 as shown in FIG. 12 comprises a board 201 having a corrugated surface and being tilted at an angle of approximately 10° to 45°. The board 201 is sufficiently long to assure proper alignment of the split straw strands, approximately 1500 mm to 4000 mm. Raised lateral edges or walls 202 contain the split straw within the device 200 while being processed. The randomly oriented split straw strands 203 are deposited onto the board 201 at the elevated end. The split straw orienter 200 is vibrated transversely. The transverse vibration may be realized using an electric motor and an eccentric. The aligned split straw strands 204 leave the device 200 at the lower end and may be fed on a transport belt or other means to maintain the alignment.

Figure 13:
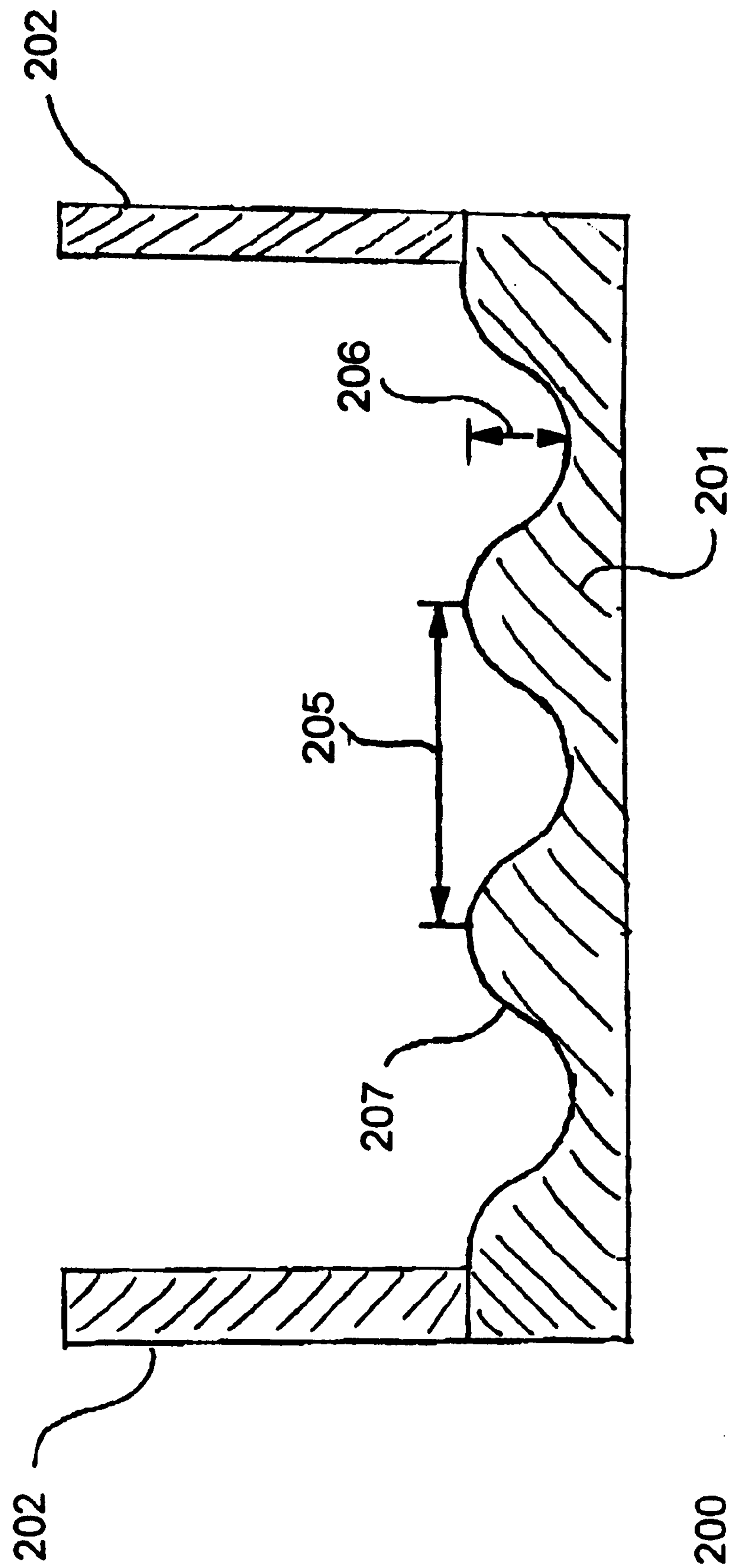
FIG. 13 illustrates a cross sectional view of the split straw orienter according to the invention.

FIG. 13 shows a cross sectional view of the split straw orienter 200. The board 201 comprises a corrugated surface of a sine like shape having a distance 205 between two consecutive ridges of approximately 25 mm to 100 mm and a depth 206 of the grooves of approximately 20 mm to 100 mm. Alternatively, different shapes of the corrugated-like surface may be envisaged such as a triangular shape or spiked/upright walls. Affixed to the board 201 are raised lateral edges or walls 202 to contain the split straw strands within the split straw orienter 200 during the process of aligning the split straw strands. Throughout this specification, the term corrugated should be read and understood to means corrugated or corrugated like.

Figure 14:
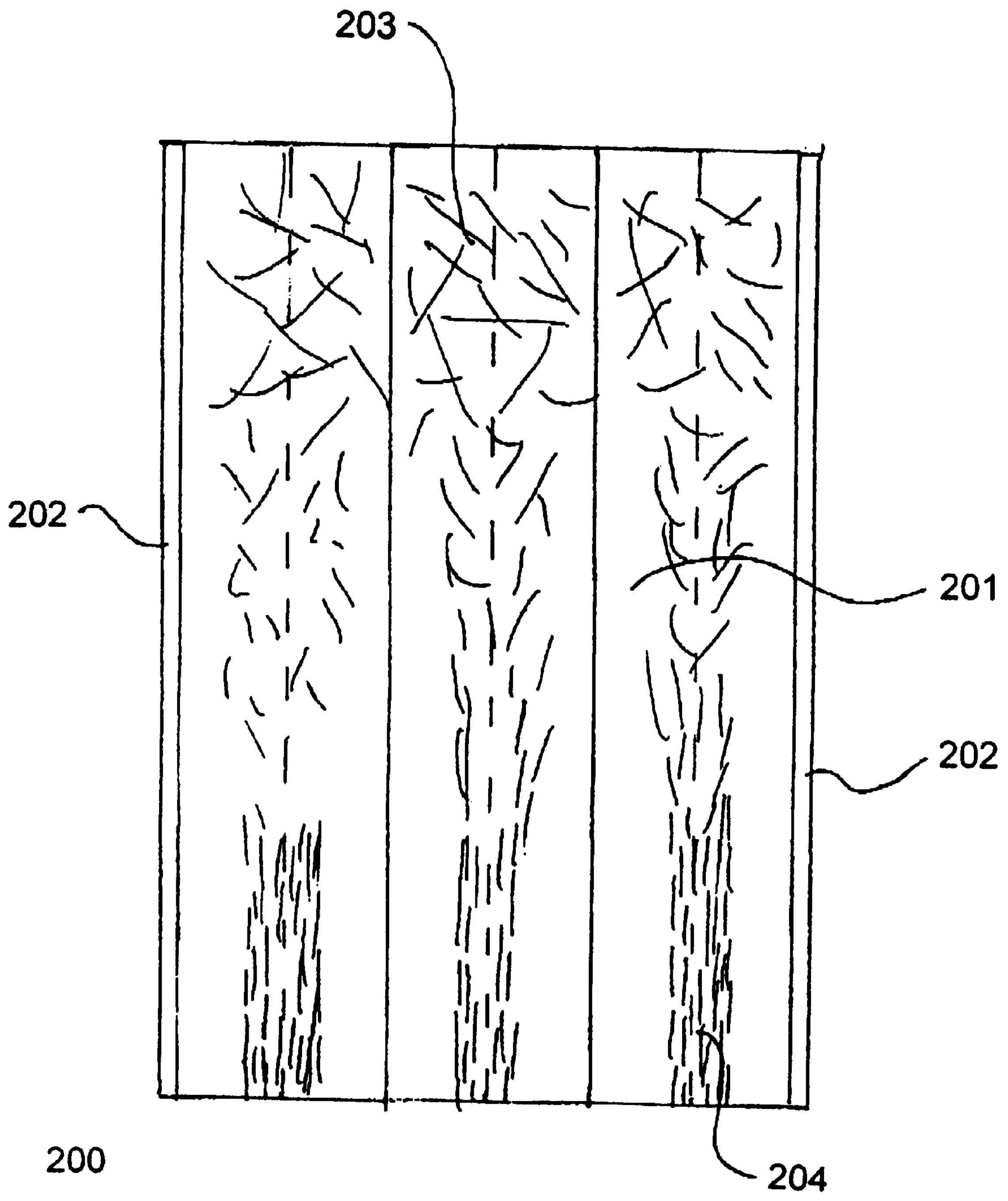
FIG. 14 illustrates a plan view of the split straw orienter according to the invention.

Referring to FIG. 14 a plan view of the split straw orienter 200 is shown. The randomly oriented split straw 203 is deposited onto the board 201 at the elevated end. Due to the transverse vibration of the corrugated surface and gravitational action the split straw strands are accumulating in the grooves of the corrugated surface being aligned by the groove walls 207, seen in FIG. 13. The tilting of the board 201 ensures the movement of the split straw strands during the aligning process to the lower end of the board 201 by gravitational action.

What is claimed is:

1. A method of fabricating a panel, board or beam comprising the steps of:

providing a plurality of pieces of straw;

splitting the pieces of straw longitudinally into separated strands by passing the pieces of straw through at least two shearing rollers having cutting edges, the two rollers having substantially different circumferential speeds for providing separated longitudinal strands;

adding binder to the straw strands; and, pressing the straw strands and allowing the binder to set.

2. A method as defined in claim 1, including the step of at least partially dewaxing a plurality of the pieces of straw.

3. A method as defined in claim 1, wherein the length of most of the straw strands provided exceed about 10 mm.

4. A method as defined in claim 1, wherein the pieces of straw are longitudinally split into separate strands and oriented such that a plurality of strands are parallel prior to adding binder.

5. A method as defined in claim 1, wherein the binder is an isocyanate resin.

6. A method as defined in claim 1, further comprising the step of adding additional lignocellulosic material other than straw to form outer layers about the pressed straw.

7. A method as defined in claim 6, wherein the added outer layers are comprised of wood.

8. A method as defined in claim 1, wherein the binder is a resin, and further comprising the step of adding an extending agent to extend the resin.

9. A method as defined in claim 1, further comprising the step of orienting the straw such that a plurality of strands are substantially parallel by placing the straw on a corrugated or corrugated-like support, and shaking the corrugated support.

10. A method as defined in claim 9, wherein the corrugated support has slots therein to allow oriented straw to pass therethrough.

11. A method as defined in claim 1, wherein the rollers are substantially the same size and having a diameter of substantially about 200 mm to 800 mm.

12. A method as defined in claim 1, wherein the rollers are knurled and wherein the clearance between the two-knurled shear rollers is substantially about 0.10 mm to 0.30 mm.

13. A method as defined in claim 1, wherein wherein respective cutting edges between the two rollers are non-parallel for providing a scissoring action upon the pieces of straw passing therethrough and for providing separated longitudinal strands.

14. A method as defined in claim 13, wherein one of the rollers in operation rotates clockwise and the other of the rollers rotates counter clockwise.

15. A method as defined in claim 14, wherein one of the rollers is rotated substantially about at least 5 times faster than the other.

* * * * *